(12) United States Patent
McGourin et al.

(10) Patent No.: US 7,334,676 B1
(45) Date of Patent: Feb. 26, 2008

(54) COMPENSATING ROLLER SYSTEM

(75) Inventors: Casey L. McGourin, Spangle, WA (US); Richard A. McQuary, Spokane, WA (US); Jacob M. Culley, Cheney, WA (US); Michael J. Johnson, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 0 days.

(21) Appl. No.: 11/671,890

(22) Filed: Feb. 6, 2007

Related U.S. Application Data (60) Provisional application No. 60/743,254, filed on Feb. 8, 2006.

(51) Int. Cl.
*B65G 15/12* (2006.01)
(52) U.S. Cl. .................... 198/626.6; 198/626.3
(58) Field of Classification Search ............ 198/626.1, 198/626.3, 626.4, 626.5, 626.6, 606
See application file for complete search history.

(56) References Cited

U.S. PATENT DOCUMENTS

| | | | |
|---|---|---|---|
| 1,345,454 A * | 7/1920 | Mascart ................... | 198/626.4 |
| 3,170,564 A * | 2/1965 | Gatto ...................... | 198/626.5 |
| 3,521,322 A * | 7/1970 | Werner et al. ........... | 198/626.6 |
| 3,802,549 A * | 4/1974 | Kinsey .................... | 198/626.6 |
| 3,951,257 A * | 4/1976 | Storace et al. ........... | 198/626.6 |
| 4,856,956 A * | 8/1989 | Zur .......................... | 198/626.5 |
| 5,966,901 A * | 10/1999 | Komp et al. ............. | 198/626.3 |
| 6,248,245 B1 * | 6/2001 | Thompson ............... | 198/626.3 |

* cited by examiner

*Primary Examiner*—James R. Bidwell
(74) *Attorney, Agent, or Firm*—Lee & Hayes, PLLC (57) ABSTRACT

A compensating roller system is adapted to adjust to size variation of product moving through a conveyor system. In one example, the compensating roller system is used to control a force resulting in deflection of a conveyor belt. In a specific implementation of such an example, a first rail is configured to support a first conveyor belt. A plurality of rollers is attached to the first rail and supports a conveyor belt moving over the rollers. The attachment allows each roller to pivot independently of movement of other rollers. Each of the rollers' movement is against a bias, and allows for deflection of the conveyor belt. A second rail may be configured as the first rail, and oriented define a channel for product movement between conveyor belts carried by the first and second rails.

18 Claims, 7 Drawing Sheets

COMPENSATING ROLLER SYSTEM

RELATED APPLICATIONS

This patent application claims priority to U.S. patent application Ser. No. 60/743,254, titled "Case Sealer with Compensating Roller System", filed on Feb. 8, 2006, commonly assigned herewith, and hereby incorporated by reference.

BACKGROUND

Conveyor systems using one or more belts are frequently used to move product between locations. In some applications, boxes are moved by a conveyor system having two conveyor belts configured so that one conveyor belt is in contact with each of two opposite sides of a box. Additionally, a passive third conveyor or rollers support a bottom surface of the box. For example, the left and right sides of a box may be in contact with driven conveyor belts, while the bottom of the box moves passively on a lower conveyor belt or rollers. By separating the left and right driven conveyor belts by a distance related to the width of the box moving within the conveyor system, friction between the left and right conveyor belt will move the box through the conveyor system.

Unfortunately, it is common for the dimensions of product, such as the boxes moving within the conveyor system of the above example, to vary. This can result in application of excessive friction and pressure to larger boxes, and inadequate friction and pressure to smaller boxes.

Accordingly, a need exists for improved conveyor systems and components within such systems.

SUMMARY

A compensating roller system is configured for use in applications, such as use in a conveyor system, wherein one or more rollers are configured to move against a bias. In an application utilizing a conveyor belt, rollers within the compensating roller system support an inside surface of the conveyor belt. A bias controlling deflection of individual rollers is used to oppose a force resulting in deflection of the conveyor belt. In such an application, movement of the rollers supporting the conveyor belt against their bias compensates for size variation of product moved by the system.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

The following discussion is directed to a compensating roller system. In one example, the roller system is configured as part of a conveyor system. In such an application, rollers within the compensating roller system support a conveyor belt. A bias controlling deflection of individual rollers is used to control a force resulting in deflection of the conveyor belt. Thus, movement of the rollers supporting the conveyor belt compensates for size variation of product moved by the system.

Example Construction

Figure 1:
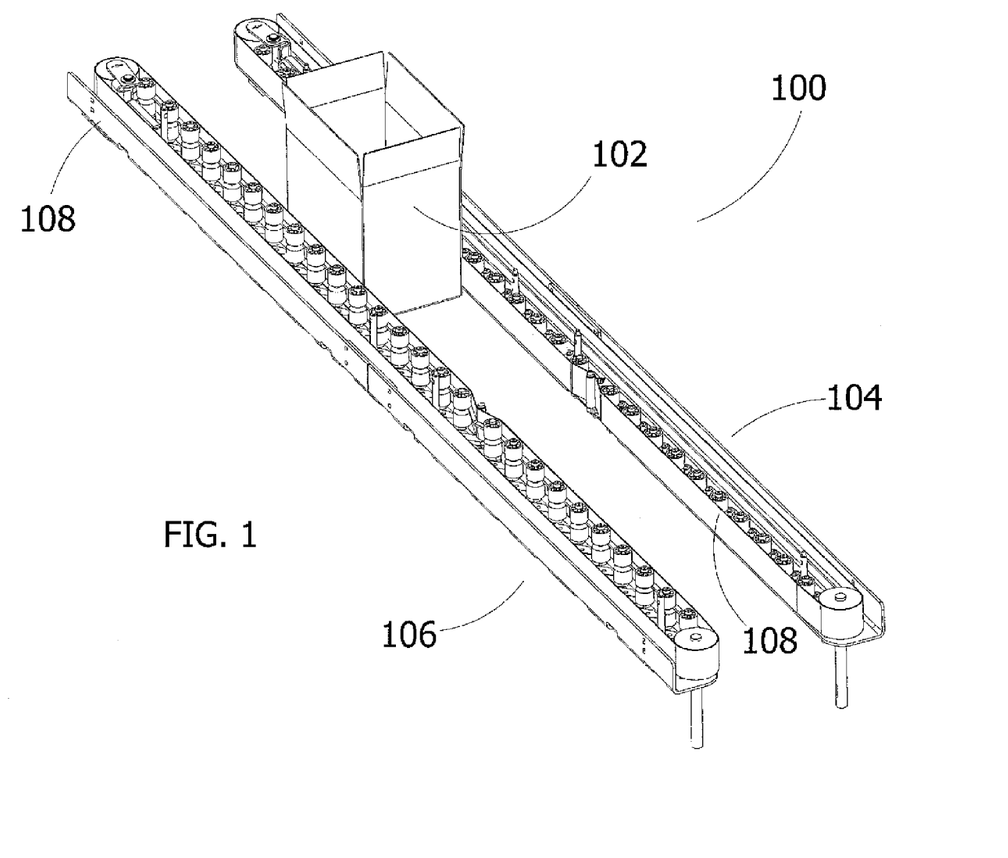
FIG. 1 shows an isometric view of an example of a conveyor system having two opposed conveyor belts, shown moving a box.

FIG. 1 shows an example of a conveyor system 100 configured with a compensating roller system. In the conveyor system shown, a box 102 (not part of the conveyor system) is moving from the upper left to the lower right. The box is propelled by movement of the two opposed conveyor assemblies 104, 106. The two opposed conveyor assemblies 104, 106 are separated by a distance, thereby forming a channel for product travel, which is incrementally less than the width of the box 102. Accordingly, a conveyor belt 108 moving within each conveyor assembly 104, 106 makes frictional contact with the box 102, thereby driving the box through the conveyor system 100.

Figure 2:
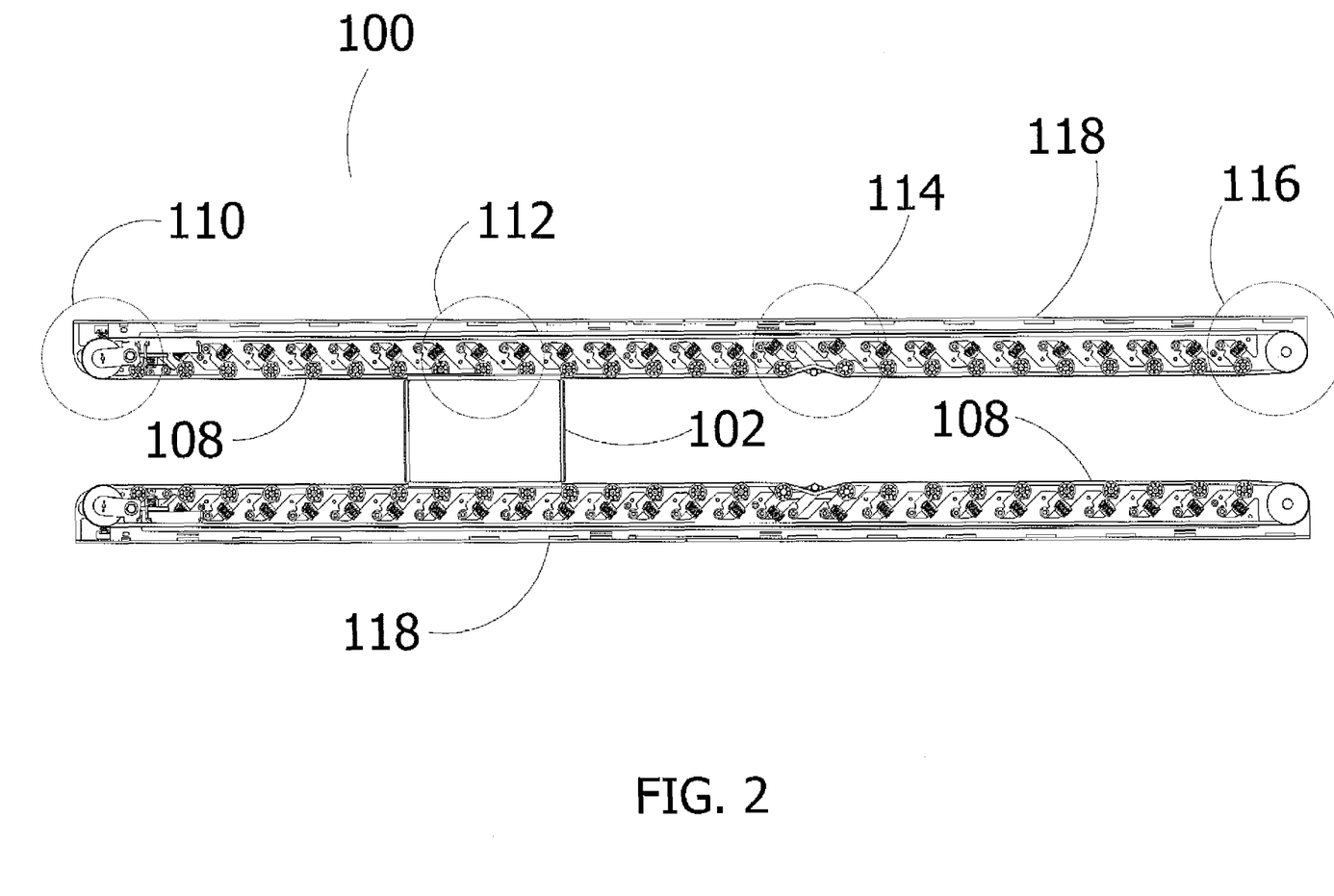
FIG. 2 shows an orthographic view of the conveyor system of FIG. 1.

FIG. 2 shows an orthographic view of the conveyor system 100 of FIG. 1. A box 102 is shown moving from left to right. FIG. 2 shows an example of the orientation of several component parts of the conveyor system 100, including tail roller assemblies 110, roller assemblies 112, belt-supporting roller 114 and drive roller 116. Accordingly, product, such as the box 102, enters the conveyor system 100 at the tail roller assembly 110. The product passes a number of roller assemblies 112, with which the conveyor belt 108 is in contact. Belt-supporting roller assemblies 114 apply a tension to the belt 108, keeping the belt in contact with rollers within the roller assemblies. In the example of FIG. 2, the drive roller 116 is supported in a fixed location relative to a rail 118, which forms a frame for each conveyor assembly 104, 106 (FIG. 1).

Figure 3:
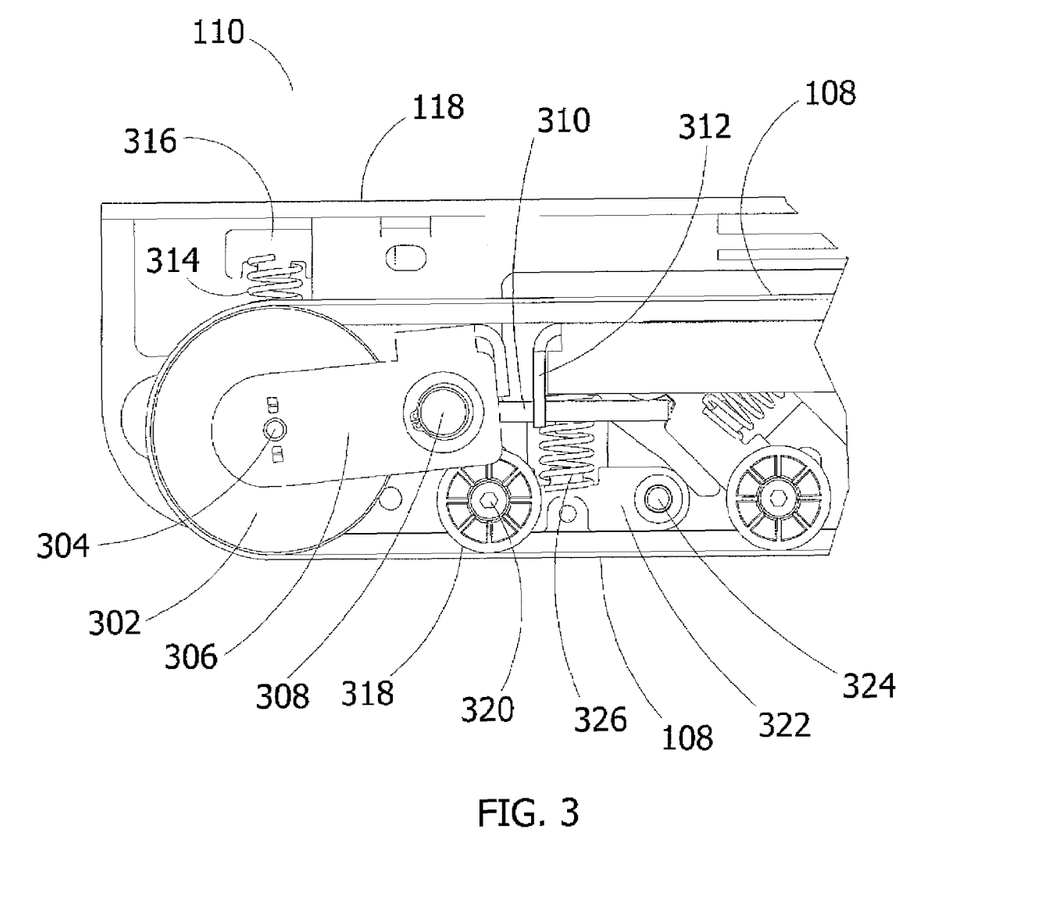
FIG. 3 shows an enlarged view of an example of a tail roller assembly shown in FIG. 2.

FIG. 3 shows an enlarged view of an example of the tail roller assembly 110 shown in FIG. 2. Each tail roller assembly 110 is configured to include a tail roller 302 that pivots slightly from a resting, or default, position to increase a distance between the two tail roller assemblies of the two conveyor assemblies 104, 106, respectively (as seen in FIG. 2). The example tail roller assembly 110 of FIG. 3 includes a tail roller 302 mounted to revolve about a tail roller axle 304. The tail roller axle 304 is supported for movement by a tail roller pivot arm 306, which pivots about a tail roller pivot arm axle 308. The location of the tail roller pivot arm axle 308 is finely controlled by an adjustment element, which allows the tail roller pivot arm axle to be moved in a direction parallel to the rail 118. One effect of such movement is to tension the conveyor belt 108. In the example of FIG. 3, the tail roller pivot arm axle adjustment element is an adjustment bolt 310, which may be mounted in a threaded passage through a pivot arm bolt support 312, which may be secured to the rail 118.

Movement of the tail roller 302 and pivot arm 306 is resisted by a spring 314 or other biasing element. In the example of FIG. 3, the spring 314 is attached to the rail 118 at a mount 316. Thus, contact with a box 102 or other product moving through the conveyor system 100 can result in deflection of the tail roller 302 and pivot arm 306 about pivot 308 and against the bias of spring 314.

In the example of FIG. 3, the pivot 308 is located slightly off-center. That is, pivot 308 is closer to one side (the upper side, in FIG. 3) of the belt 108 than to the other side of the belt. The off-center location of the pivot 308 reduces movement of the pivot arm 306 against the bias of the spring 314.

Continuing to refer to FIG. 3, a secondary tail roller 318 may be provided. In the example of FIG. 3, the secondary roller 318 is supported by an axle 320 attached to a secondary tail roller pivot arm 322. The pivot arm 322 pivots slightly about an axle 324, which is fixed relative to the rail 118. Movement of the pivot arm 322 is damped by a spring 326 or similar biasing element.

Figure 4:
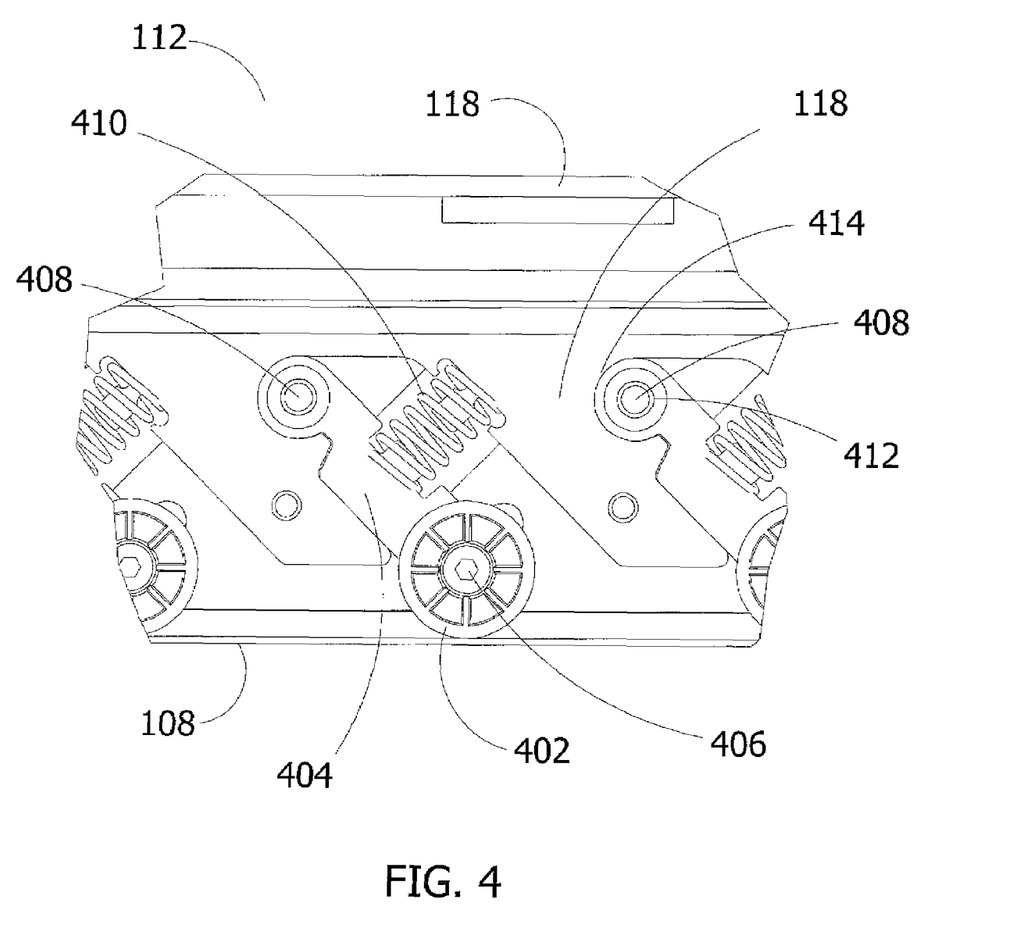
FIG. 4 shows an enlarged view of an example of a roller assembly shown in FIG. 2.

FIG. 4 shows an enlarged view of an example of the roller assembly 112 shown in FIG. 2. A roller 402 is in contact with an inner surface of the belt 108. The roller is attached to a pivot arm 404 at the axle 406. The pivot arm 404 pivots at pivot 408, which is fixed with respect to the rail 118. Movement of the pivot arm 404 is biased by spring 410 or similar biasing element. Thus, when a box or other product moving through the conveyor system is wider than a distance separating the conveyor assemblies, the conveyor belt 108 deflects slightly, deviating from a nominal course of travel. Accordingly, the biasing element 410 resists pivotal movement of the roller 402 and deflection of the conveyor belt 108. Such deflection is made possible by the movement against bias of one or more rollers 402, which in most applications are configured to move independently. Note that in the example of FIG. 4, adjacent rollers 402 are allowed movement independent of each other; that is, the pivot arms 404 are typically not linked. Because of the orientation of the pivot arms 404, the direction of the pivot includes a component direction that is parallel to a direction of product flow through the conveyor system. Another component direction is perpendicular to the flow, allowing the space (channel) within which product travels to be increased. Looked at another way, each roller 402 moves both back (i.e. in the direction of product travel) and away (i.e. away from the product/box in the channel between conveyor assemblies) as the spring 410 is compressed. In a typical application, the movement away from the product/box in the channel exceeds an expected variation in a size of product moving through the conveyor system.

In an alternative construction, two or more adjacent rollers 402 may be linked together, in a manner that results in a mutual movement. The structure linking adjacent rollers together may depend on the application; however, links similar to the linkages 510, 512 seen in FIG. 5 could be used to link together one or more adjacent rollers 402. In this construction, the linked rollers 402 would operate "in concert" or as a "gang" and tend to deflect in unison in response the deviation from the nominal course of travel of the conveyor belt 108. Such deviation in the conveyor belt 108 could be caused by travel of an oversized object through the channel defined between opposed conveyor assemblies 104, 106.

Continuing to refer to FIG. 4, the rail 118 may be constructed of a variety of materials, such as steel or synthetic products. In one application, at least a portion of the rail may be made of a synthetic product such as Nylatron®. In such an application, each pivot arm 404 may be supported by an axle 408 that fits loosely within a hole 412 defined in each pivot arm. As the pivot arm moves during operation, an outer surface of each pivot arm 404 is then seated against a bearing surface 414. Where an appropriate material is selected for the portion of the rail defining the bearing surface, the pivot arm 404 may move with a satisfactory amount of support and friction. In one example of such a configuration, the axle 408 and pivot arm 404 could both be made of steel, while the bearing surface 414 is made of a softer material.

A review of FIGS. 3 and 4 indicates that the tail roller 302 is configured to pivot against bias in a direction opposite to pivotal movement against bias of the rollers 402. In the example of FIGS. 3 and 4, the tail roller 302 pivots about 308 in a clockwise direction against the bias of spring 314. In contrast, the rollers 402 pivot counterclockwise against the bias of spring 410.

Figure 5:
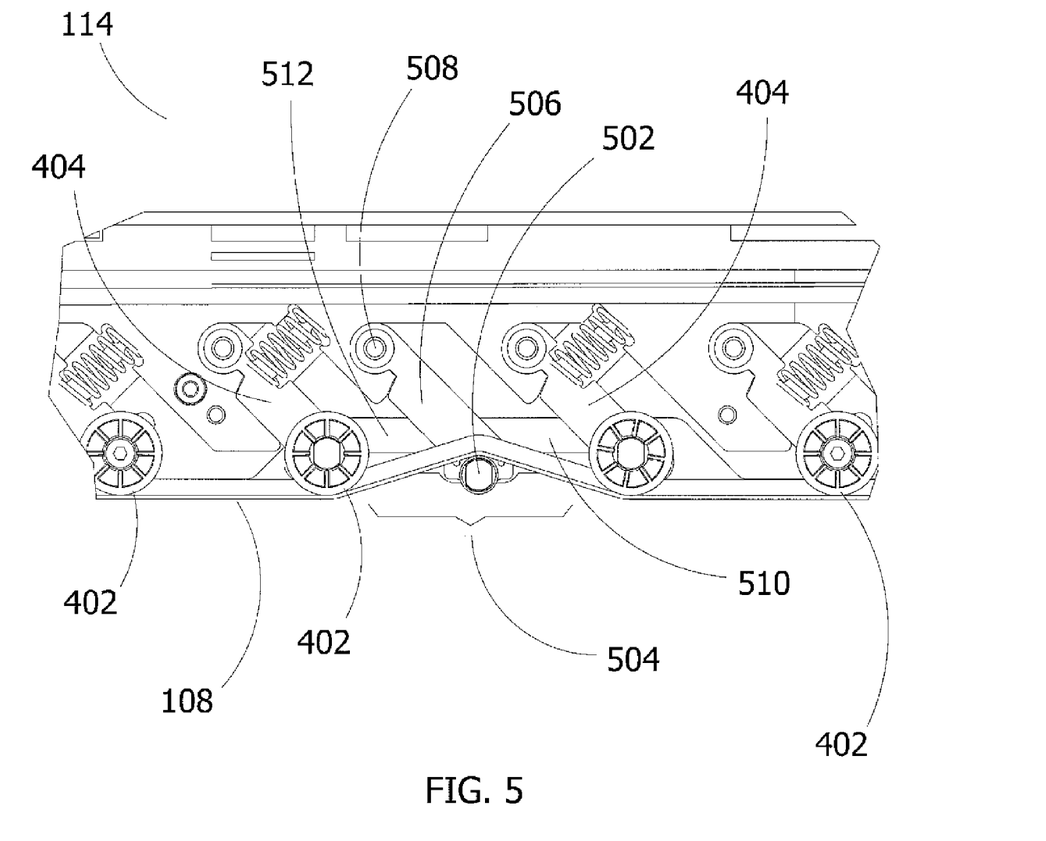
FIG. 5 shows an enlarged view of an example of a belt-supporting roller assembly shown in FIG. 2.

FIG. 5 shows an enlarged view of an example of a belt-supporting roller assembly 114 shown in FIG. 2. The belt-supporting roller assembly 114 is particularly useful in longer conveyor assemblies 104, 106, wherein the belt 108 may be more likely to separate from the one or more rollers 402. A roller 502 adjusts a path followed by the belt 108 to create a deflected belt segment or local deformation 504, i.e. a section of the belt 108 wherein the belt is deflected slightly in a manner that promotes contact between the belt and one or more rollers 402 in both directions adjacent to the roller 502. The roller 502 is supported by a pivot arm 506, which moves about pivot 508. In some applications, movement of the pivot arm 506 may be restricted by at least one of a forward linkage 510 and a rearward linkage 512. The linkages may be a single rigid connector, or may be formed from two links with a pivot between the links. In the example of FIG. 5, the linkages 510, 512 are connected to the pivot arm 506 of the belt-supporting roller 502 and the pivot arm 404 of a roller assembly 112 forward and rearward of the belt-supporting assembly 114. The linkages 510, 512 tend to cause the roller 502 to move in unison with the rollers 402 immediately forward and rearward of the roller 502.

Figure 6:
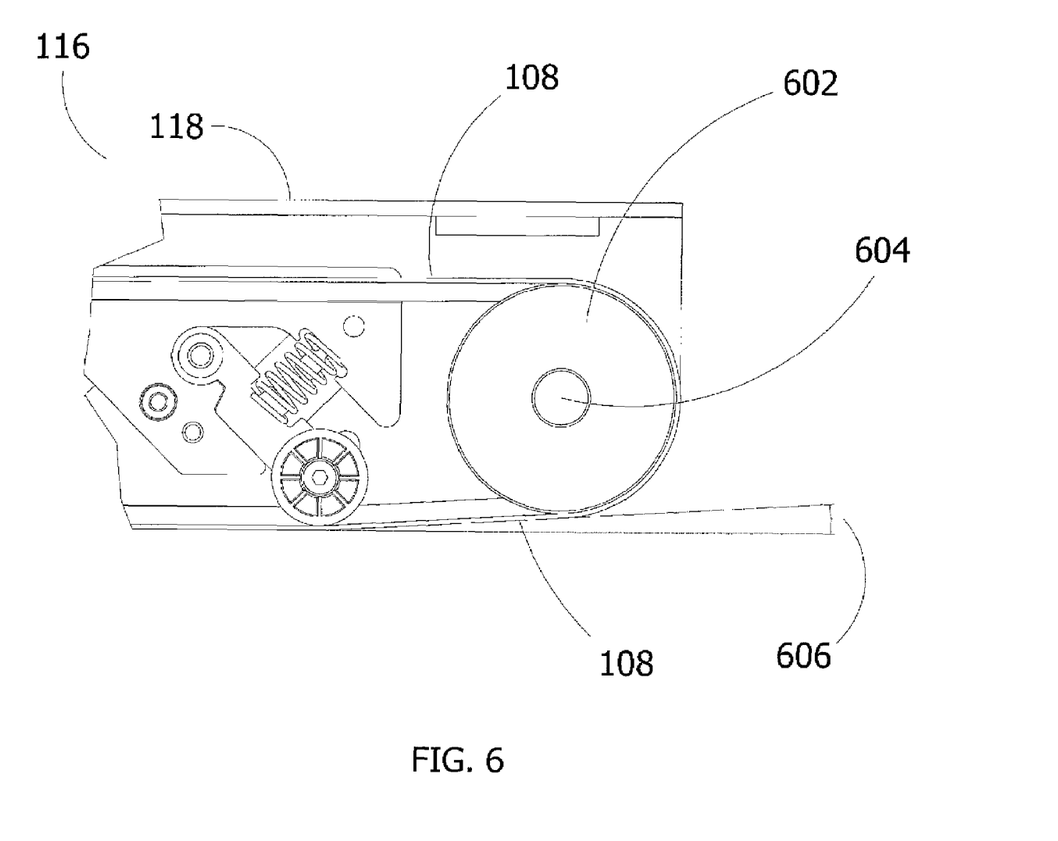
FIG. 6 shows an enlarged view of an example of a drive roller shown in FIG. 2.

FIG. 6 shows an enlarged view of the example of the drive roller assembly 116 shown in FIG. 2. The assembly 116 may include a drive roller 602, typically attached by an axle 604 to the rail 118. In the example of FIG. 6, the axle 604 is located to result in a slight deflection of the belt 108, shown as theta at 606. Such a deflection, or course or direction change, of the belt 108 results in a gradual lessening of the friction between the belt and box or other product 102 moving through the conveyor system 100 (FIGS. 1 and 2).

In some implementations, the drive roller 602 is constructed at least in part of a resiliently deformable material. The resiliently deformable, or highly frictional, material increases the frictional contact with the belt 108, thereby more effectively driving the belt. In one example, a rubber coating on the drive roller could provide a more highly frictional contact between the drive roller 602 and the belt 108, thereby reducing slippage of the belt.

FIGS. 1 and 2 illustrate an implementation having two opposed conveyor assemblies 104, 106. In such applications, the opposed assemblies 104, 106 may engage opposed sides of product (such as a box), while passive rollers (not shown) support the products as it is moved by the assemblies. However, in other applications, only a single conveyor assembly is used. In such applications, it is possible for the product to be supported by the single assembly, which then both moves and supports the product.

Example Operation

Figure 7:
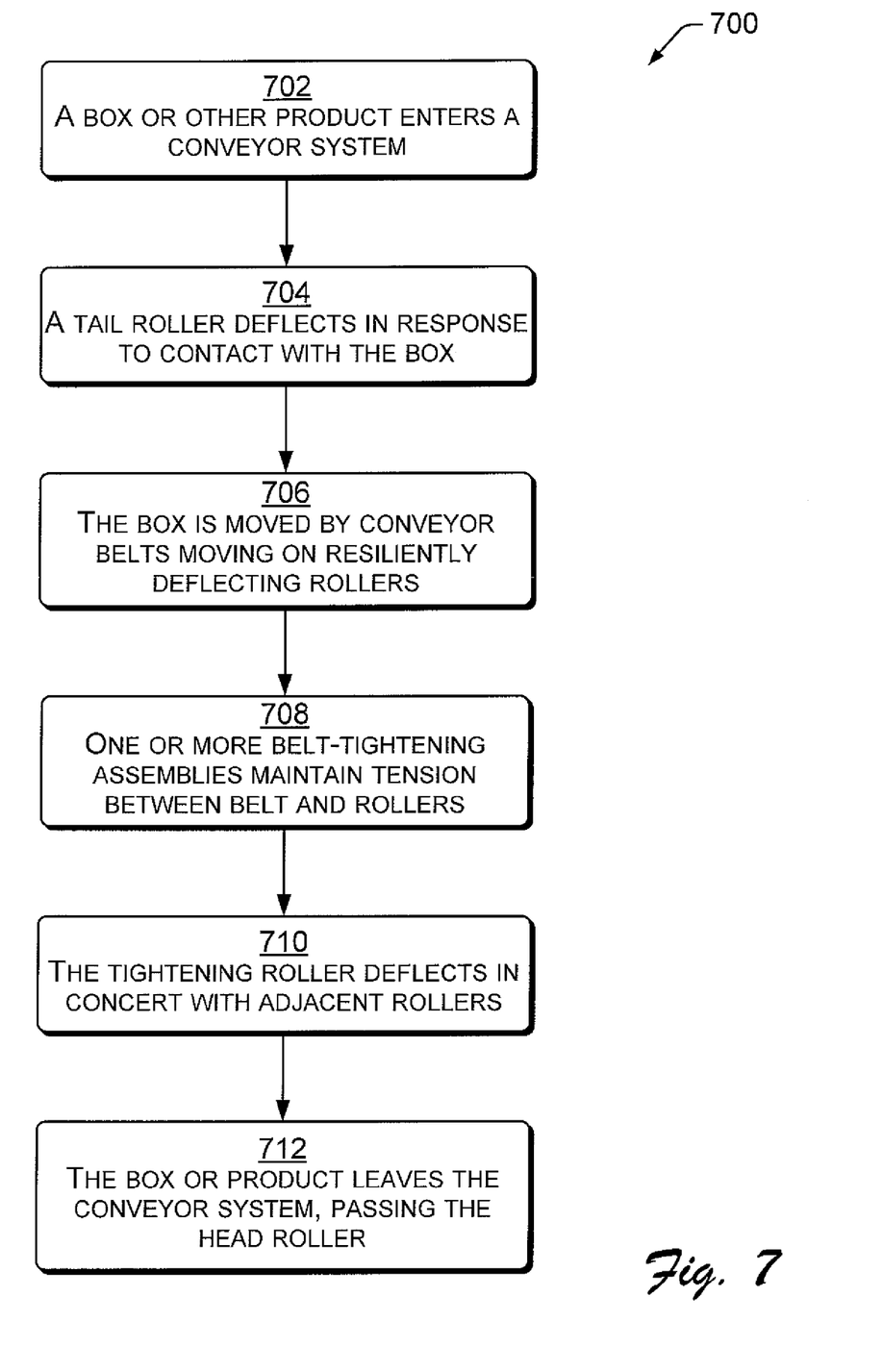
FIG. 7 shows an example method by which a compensating roller system may be operated.

Referring to FIG. 7, example aspects 700 of the operation of the example conveyor system 100 can be seen. At block 702, a box or other product enters a conveyor system. For example, in the conveyor system of FIG. 1, a box 102 is shown moving from left to right, entering the conveyor system 100 at the tail roller assembly 110 and leaving at the drive roller assembly 116. At block 704, one or more tail rollers deflect in response to contact with the box or other product. An example of such deflection can be understood with reference to FIG. 3, wherein contact with a box can result in the tail roller 302 deflecting slightly in a direction that compresses the spring 314. Thus, the distance between two opposed tail rollers 302 of two conveyor assemblies 104, 106 is increased. Note that location of the pivot arm axle 308 off-center (i.e. closer to the portion of the belt adjacent spring 314 than to the portion of the belt on the opposite side) prevents the tail rollers of opposed conveyor assemblies 104, 106 from seeking a resting position close to each other. That is, the resting position of each tail roller 302 is to contact, but not compress, an associated spring 314.

At block 706, the box 102 is moved through the conveyor system 100 by frictional contact with the belts 108. The belts move along the rollers 402, which are configured for resilient deflection in response to contact with the box or other product. For example, the rollers will deflect slightly in response to the size of the box applying a force to the conveyor belt. Referring to FIG. 4, it can be seen that if the box 102 is slightly larger than the space between the conveyor assemblies 104, 106, then some deflection of the rollers 402 will result. Deflection of each roller 402 will result in some compression of the associated spring 410. Accordingly, deflection results in friction between the belt 108 and box 102, ensuring movement of the box 102 within the conveyor system 100.

At block 708, the conveyor belt is kept tight against the rollers by one or more belt-supporting assemblies. Referring to FIG. 5, as the belt 108 moves in a circuitous path, it moves through the belt-supporting roller assembly 114. The belt-supporting roller 502 tends to support the belt 108 against the compensating rollers 402. Thus, a distribution of one or more belt-supporting roller assemblies 114 along the conveyor belt 108 tends to keep the belt in contact with most or all rollers 402. At block 710, the supporting roller 502 deflects in concert with adjacent rollers 402, in response to force conveyed by the linkage(s) 510, 512. Such a force could result from movement of an oversized box through the conveyor system.

At block 712, as the box 102 leaves the conveyor system 100 it passes the drive roller 602. FIG. 6 shows an example drive roller. Due to the angle theta seen at 606, the distance between belts 108 of the two conveyor assemblies 104, 106 widens slightly, and the box is released.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. A compensating roller system, comprising:
   a first rail supporting a first conveyor belt;
   a plurality of rollers, wherein each roller is pivotally mounted on the first rail and biased to resist deflection of the first conveyor belt, and wherein each roller is configured for pivotal movement independent of pivotal movement of other rollers;
   a belt-supporting roller, pivotally attached to the rail and in contact with an outer surface of the conveyor belt;
   at least one linkage, between the belt-supporting roller and an adjacent roller, to result in pivotal movement of the belt-supporting roller when the adjacent roller pivots; and
   a second rail configured as the first rail, wherein each of the first and second rails is oriented to direct rollers at the other rail and to define a channel for product movement between the first and second rails.

2. The compensating roller system of claim 1, wherein each roller is part of a roller assembly, comprising:
   a roller pivot arm, having a first end pivotally attached to the rail and a second end attached to the roller; and
   a biasing element, to resist movement of the roller pivot arm with respect to the rail in at least one direction.

3. The compensating roller system of claim 1, wherein the belt-supporting roller is attached by two linkages to two adjacent rollers, and wherein the belt-supporting roller moves in concert with the two adjacent rollers.

4. The compensating roller system of claim 1, additionally comprising:
   a tail roller attached to each of the first and second rails, wherein the tail rollers are configured to pivot against bias to result in an increased distance between the two tail rollers, and to pivot with bias to result in decreased distance between the two tail rollers.

5. The compensating roller system of claim 4, wherein each tail roller is part of a tail roller assembly comprising:
   a pivot arm comprising an axle at a first end supporting the tail roller and a second end pivotally attached to the rail; and
   a tail roller tension adjustment, to adjust a location of the second end of the pivot arm.

6. The compensating roller system of claim 5, wherein the second end of the pivot arm supporting the tail roller is located closer one side of the first conveyor belt than to the other side of the first conveyor belt.

7. A conveyor system, comprising:
   a rail supporting a conveyor belt;
   rollers pivotally mounted on the rail and in contract with an inner surface of the conveyor belt, wherein a bias against pivotal movement of the rollers resists deviation from a nominal course of travel of the conveyor belt; and
   a belt-supporting roller, attached by two linkages to two adjacent rollers, to result in movement of the belt-supporting roller in concert with pivotal movement of the two adjacent rollers.

8. The conveyor system of claim 7, wherein:
   the bias against pivotal movement of the rollers is provided by a spring resisting compression; and
   at least two adjacent rollers are configured to allow independent movement, thereby allowing the rollers to pivot to different degrees.

9. The conveyor system of claim 7, wherein:
   each roller is configured to pivot in a direction having a component parallel to a direction of product flow through the conveyor system; and a range of motion by rollers exceeds expected variation in a size of product moving through the conveyor system.

10. The conveyor system of claim 7, additionally comprising:
a tail roller attached to an end of the rail, wherein the tail roller is constructed of a resiliently deformable material configured to compensate for imprecisely sized or located product moving through the conveyor system.

11. The conveyor system of claim 7, wherein the conveyor system comprises at least one gang of rollers configured by linkages to respond in unison to the deviation from the nominal course of travel of the conveyor belt.

12. The conveyor system of claim 7, additionally comprising a second rail configured as the first rail, wherein:
the first and second rails are located to define a channel for product movement; and
different rollers pivot to different degrees to accommodate differently sized products moving within the channel.

13. The conveyor system of claim 7, wherein the belt-supporting roller is pivotally mounted to the rail.

14. A product conveyor, comprising:
a plurality of rollers supporting a conveyor belt, wherein:
the rollers are pivotally mounted on a rail such that at least two rollers pivot independently; and
a biasing element resists pivotal movement of each roller and deflection of the conveyor belt;
a tail roller attached to the rail, wherein the tail roller is configured to pivot against bias in a direction opposite to pivotal movement against bias of the rollers; and
a belt-supporting roller, linked to two adjacent rollers, and in contact with an outside surface of the conveyor belt to result in a local deformation of the conveyor belt.

15. The product conveyor of claim 14, wherein the product conveyor comprises two opposed conveyor belts, separated by a channel through which product is driven.

16. The product conveyor of claim 14, wherein the belt-supporting roller is pivotally mounted to the rail.

17. The product conveyor of claim 14, wherein:
rollers not linked to the belt-supporting roller are configured to pivot independently in response to pressure applied to the conveyor belt by product moving through the channel; and
a range of pivotal movement by rollers is consistent with expected variation in a size of product moving through the conveyor system.

18. The product conveyor of claim 14, wherein the tail roller is part of a tail roller assembly, comprising:
a pivot arm comprising an axle at a first end supporting the tail roller and a second end pivotally attached to the rail;
a biasing element to resist movement of the pivot arm; and
a tail roller tension adjustment, to adjust a location of the second end of the pivot arm.

\* \* \* \* \*